(12) United States Patent
Kim et al.

(10) Patent No.: US 11,511,835 B2
(45) Date of Patent: Nov. 29, 2022

(54) OPERATING METHOD OF MULTIPLE UNDERWATER VEHICLES AND OPERATING SYSTEM OF MULTIPLE UNDERWATER VEHICLES

(71) Applicant: National Institute of Maritime, Port and Aviation Technology, Tokyo (JP)

(72) Inventors: Kangsoo Kim, Tokyo (JP); Hiroyuki Yamato, Tokyo (JP)

(73) Assignee: NATIONAL INSTITUTE OF MARITIME, PORT AND AVIATION TECHNOLOGY, Tokyo (JP)

( * ) Notice: Subject to any disclaimer, the term of this patent is extended or adjusted under 35 U.S.C. 154(b) by 414 days.

(21) Appl. No.: 16/499,054

(22) PCT Filed: Mar. 30, 2018

(86) PCT No.: PCT/JP2018/013774
§ 371 (c)(1),
(2) Date: Dec. 9, 2019

(87) PCT Pub. No.: WO2018/181959
PCT Pub. Date: Oct. 4, 2018

(65) Prior Publication Data
US 2020/0385095 A1    Dec. 10, 2020

(30) Foreign Application Priority Data
Mar. 31, 2017  (JP) .............................. JP2017-071965

(51) Int. Cl.
*B63G 8/00* (2006.01)
*G05D 1/02* (2020.01)
(Continued)

(52) U.S. Cl.
CPC .......... *B63G 8/001* (2013.01); *G05D 1/0206* (2013.01); *G05D 1/10* (2013.01); *B63G 2008/004* (2013.01); *G01S 15/88* (2013.01)

(58) Field of Classification Search
CPC . B63G 8/00; B63G 8/001; B63G 8/14; G05D 1/00; G05D 1/0206; G05D 1/10;
(Continued)

(56) References Cited

U.S. PATENT DOCUMENTS 5,894,450 A     4/1999  Schmidt
7,796,809 B1 *  9/2010  Carder ................. G06K 9/2018
                                                         382/154

(Continued)

FOREIGN PATENT DOCUMENTS

JP     H03-266794 A    11/1991
JP     H05-147583 A     6/1993
(Continued)

OTHER PUBLICATIONS

Notification of Transmittal of Copies of Translation of the International Preliminary Report on Patentability tor International Application No. PCT/JP2018/013774 dated Oct. 3, 2019 (1 sheet).
(Continued)

*Primary Examiner* — Lars A Olson
(74) *Attorney, Agent, or Firm* — Kratz, Quintos & Hanson, LLP (57) ABSTRACT

The present invention provides an operating method and an operating system of a multiple underwater vehicles 30, wherein exploration missions and exploration depths of the multiple underwater vehicles 30 are differently set in the underwater vehicles 30 for exploring a water bottom, the multiple underwater vehicles 30 are submerged to the respective set exploration depths, the multiple underwater vehicles 30 are made to cruise at the respective set explo- (Continued)

ration depths to execute the exploration missions, and execution results of the exploration missions are recorded and/or transmitted. According to this, it is possible to deploy and operate the multiple underwater vehicles and safely and efficiently explore the water bottom.

12 Claims, 6 Drawing Sheets

(51) Int. Cl.
*G05D 1/10* (2006.01)
*G01S 15/88* (2006.01)

(58) Field of Classification Search
CPC . G01S 15/88; G01V 1/00; G01V 1/04; G01V 1/38; G01V 1/3808; G01V 1/3843
USPC .......................................................... 114/312
See application file for complete search history.

(56) References Cited

U.S. PATENT DOCUMENTS

| | | | |
|---|---|---|---|
| 9,321,514 B2* | 4/2016 | Lelaurin | ............ G01V 1/3843 |
| 9,417,351 B2* | 8/2016 | Brizard | ............... G01V 1/3843 |
| 10,281,929 B2* | 5/2019 | Ibn Seddik | .............. B63G 8/14 |
| 2016/0253906 A1 | 9/2016 | Celikkol | |
| 2016/0355247 A1 | 12/2016 | Ibn Seddik | |

FOREIGN PATENT DOCUMENTS

| | | |
|---|---|---|
| JP | 2001-308766 A | 11/2001 |
| JP | 2002-145187 A | 5/2002 |
| JP | 2003-026090 A | 1/2003 |
| JP | 2004-184268 A | 7/2004 |
| JP | 2009-227086 A | 10/2009 |
| JP | 2010-139270 A | 6/2010 |
| KR | 10-2016-0055609 A | 5/2016 |

OTHER PUBLICATIONS

International Preliminary Report on Patentability for International Application No. PCT/JP2018/013774 dated Oct. 3, 2019 (5 sheets).
Supplementary European Search Report for corresponding European Patent Application No. 18774884.3 dated Nov. 27, 2020 (9 sheets).
International Search Report for International Application No. PCT/JP2018/013774 dated Jun. 19, 2018 (3 sheets, 1 sheet translation).
Written Opinion of the International Searching Authority for International Application No. PCT/JP2018/013774 dated Jun. 19, 2018 (4 sheets).

* cited by examiner

OPERATING METHOD OF MULTIPLE UNDERWATER VEHICLES AND OPERATING SYSTEM OF MULTIPLE UNDERWATER VEHICLES

TECHNICAL FIELD

The present invention relates to an operating method of a multiple underwater vehicles and to operating system of the multiple underwater vehicles which carry out water bottom exploration.

BACKGROUND TECHNIQUE

When an underwater vehicle is introduced into a research water area to conduct water bottom exploration in marine and lake, a ship located on water or a device placed in water controls the underwater vehicle.

For example, patent document 1 discloses a technique in which an underwater station connected to a mother ship through a cable is placed in seawater, an acoustic transponder is placed undersea in the vicinity of an exploration position point, a multiple cable type unmanned submersible vessels are induced by introducing them into communication with the underwater station and the acoustic transponder using an ultrasonic wave signal, the no-cable type unmanned submersible vessels are docked to the underwater station if necessary, battery is charged or battery is exchanged and exploration data is retrieved.

Patent document 2 discloses a technique in which an underwater station having a first transponder, a first wave receiver and a second wave receiver is suspended in seawater from a mother ship, a second transponder is placed undersea, an autonomous unmanned vehicle for an exploration is provided with a third transponder and a third wave receiver, the underwater station holds a fixed point by receiving a signal of the second transponder by means of the first wave receiver, the autonomous unmanned vehicle self-navigates by receiving a signal of the second transponder by means of the third wave receiver during exploration, and if power is reduced, the autonomous unmanned vehicle cruises toward the underwater station by receiving a signal of the first transponder by means of the third wave receiver, and the underwater station controls attitude for storing autonomous unmanned cruising by receiving a signal of the third transponder by means of the second wave receiver.

Patent document 3 discloses a technique in which a mother ship located on the water is provided with a transmitter, an unmanned submersible for exploration is provided with a wave receiver, and in underwater acoustic communication for sending a control signal from the mother ship to the unmanned submersible, transmission errors are corrected utilizing Hough transform of a pixel signal.

Patent document 4 discloses a technique in which a self-propelled repeater which relays communication between a mother ship and an underwater vehicle is placed in the vicinity of a water surface of an observation region, communication between the self-propelled repeater and the mother ship is carried out by waving, and communication between the self-propelled repeater and the underwater vehicle is carried out by acoustic communication, thereby enhancing a communication-possible distance in a horizontal direction.

PRIOR ART DOCUMENTS

Patent Documents

[Patent Document 1] Japanese Patent Application Laid-open. No. H3-266794

[Patent Document 2] Japanese Patent Application Laid-open No. 2003-26090

[Patent. Document 3] Japanese Patent Application Laid-open No. H5-147583

[Patent Document 4] Japanese Patent Application Laid-open. No. 2001-308766

SUMMARY OF THE INVENTION

Problem to be Solved by the Invention

Meanwhile, since speed of the underwater vehicle is slow, if the number of the underwater vehicles is only one, it takes time to research a wide water area, but from the aspect of energy consumption, there is a limit to increase the speed of the underwater vehicle. Hence, to efficiently research a wide water area, it can be considered to introduced a multiple underwater vehicles. However, if a multiple underwater vehicles are introduced, since control becomes complicated, there are problems in terms of researching efficiency and safety.

An invention described in patent document 1 does not disclose the control which enhances researching efficiency and safety while taking, into account, exploration mission and the like of a multiple no-cable type unmanned submersibles. Further, since the mother ship and the underwater station are connected to each other through a cable, movements of the mother ship and the underwater station are limited.

An invention described in patent document 2 does not disclose the control which enhances researching efficiency and safety while taking, into account, exploration mission and the like of the multiple autonomous unmanned vehicles. Further, since the underwater station is suspended from the mother ship, movements of the mother ship and the underwater station are limited.

According to an invention described in patent document 3, the fact that underwater acoustic communication is subject to effects of reflection sound of a water surface and sea bottom is taken into consideration, unmanned submersible is prevented from being introduced into an uncontrolled state by estimating a correct control signal even if transmission errors are included therein. However, patent document 3 does not disclose the control which enhances researching efficiency and safety while taking, into account, exploration mission and the like of the multiple unmanned submersibles.

Patent document 4 describes an invention that a self-propelled repeater determines whether there is horizontal movement based on current position information of the self-propelled repeater and current position information of an underwater vehicle, and a communication state with respect to the underwater vehicle is maintained. It is also described that a multiple underwater vehicles can be introduced. However, if the multiple underwater vehicles are introduced, patent document 4 does not disclose the control which enhances researching efficiency and safety while taking, into account, exploration mission and the like.

Thereupon, it is an object of the present invention to provide an operating method of a multiple underwater vehicles and to an operating system of the multiple underwater vehicles capable of deploying and operating the multiple underwater vehicles and capable safely and efficiently carrying out exploration of water bottom.

Means for Solving the Problem

In an operating method of a multiple underwater vehicles, wherein in order to explore a water bottom, exploration missions and exploration depths of the multiple underwater vehicles which cruise at an exploration depth close to a water bottom are previously differently set n the underwater vehicles, the multiple underwater vehicles are submerged to the respective set exploration depths, the multiple underwater vehicles are made to cruise at the respective set exploration depths to execute the exploration missions under control of the on-water control means placed near a water surface, and execution results of the exploration missions are recorded and/or transmitted.

According to the invention, since the multiple underwater vehicles execute exploration missions respectively allocated to different exploration depths, exploration can be carried out efficiently.

Here, the exploration includes all of operation actions carried out by the underwater vehicles in water bottom such as an observing operation, a searching operation, a collecting operation, a rescue operation and a transport operation.

In the present invention, the multiple underwater vehicles include exploration regions at the respective set exploration depths.

According to the invention, the exploration regions can further efficiently be explored.

In the present invention described, cruising paths of the underwater vehicles are set such that cruising loca of the underwater vehicles which cruise in the respective exploration regions are not vertically superposed on each other simultaneously.

According to the invention, it is possible to prevent the underwater vehicles having close exploration depths from colliding against each other due to errors and the like in measurement and control, and it is possible to enhance the safety. Further, since the underwater vehicles are not vertically superposed on each other, it is possible to reduce generation of troubles in the underwater vehicles related to exploration such as erroneous observation and observation inability.

In the present invention, the exploration depths which are differently set in the underwater vehicles include a deep exploration depth which is close to the water bottom and a shallow exploration depth which is far from the water bottom.

According to the invention described, it is possible to efficiently explore a region close to the water bottom and a region far from the water bottom.

In the present invention, cruising speed of the underwater vehicle having the deep exploration depth is slower than cruising speed of the underwater vehicle having the shallow exploration depth.

According to the invention, the underwater vehicle which carries out the exploration at deep exploration depths can carry out exploration more precisely.

In the present invention, a height from the water bottom on which the underwater vehicle at the deep exploration depth can cruise is 1 m or more and less than 50 m, and a height from the water bottom on which the underwater vehicle at the shallow exploration depth can cruise is 10 m or more and less than 200 m.

According to the invention, it is possible to efficiently explore a region at a height of 1 m or more and less than 50 m from, the water bottom and a region at a height of 10 m or more and less than 200 m.

In the present invention, an image taking operation of the water bottom is included in the exploration mission of the underwater vehicle having the deep exploration depth.

According to the invention, an image of the water bottom can be included in an exploration result.

In the present invention, research of a land form of the water bottom and/or research of a geological layer underwater is included in the exploration mission of the underwater vehicle having the shallow exploration depth.

According to the invention, at least one of a land form and a geological layer of the water bottom can be included in the exploration result.

In the present invention, positions of the multiple underwater vehicles are measured by acoustic positioning means provided in the on-water control means having moving means and capable of cruising near a water surface and/or communication is performed utilizing communication means which are respectively provided in the underwater vehicles and the on-water control means, and the exploration mission is executed.

According to the invention, since the on-water control means can grasp at least one of positions and communication states of the multiple underwater vehicles, the multiple underwater vehicles can more safely and efficiently carry out the exploration operation under control of the on-water control means.

In an operating system of a multiple underwater vehicles corresponding, the operating system including the multiple uncle vehicles which cruise at an exploration depths close to a water bottom, exploration condition setting means which previously differently sets exploration missions and exploration depths provided in the multiple underwater vehicles, submerging means for submerging the multiple underwater vehicles to the respective set exploration depths, on-water control means placed near a water surface, exploration mission executing means for cruising the multiple underwater vehicles at the respective set exploration depths to execute the exploration missions under control of the on-water control means, and recording means and/or transmission means for recording and/or transmitting an execution result of the exploration mission.

According to the invention, since the multiple underwater vehicles execute exploration missions allocated to different exploration depths, exploration can efficiently, be carried out.

In the present invention, the exploration condition setting means sets exploration regions of the multiple underwater vehicles at the respective set exploration depths.

According to the invention , it is possible to explore the respective exploration regions more efficiently.

In the present invention, the exploration regions are set such that cruising paths of the cruising underwater vehicles are not vertically superposed on each other simultaneously.

According to the invention, it is possible to prevent the underwater vehicles having close exploration depths from colliding against each other due to errors and the like in measurement and control, and it is possible to enhance the safety. Further, since the underwater vehicles are not vertically superposed on each other, it is possible to reduce generation of troubles in the underwater vehicles related to exploration such as erroneous observation and observation inability.

In the present invention, the exploration depths which are differently set by the exploration condition setting means include a deep exploration depth which is close to the water bottom and a shallow exploration depth which is far from the water bottom.

According to the invention, it is possible to efficiently explore a region close to the water bottom and a region far from the water bottom.

In the present invention, cruising speed of the underwater vehicle having the deep exploration depth is set slower than cruising speed of the underwater vehicle having the shallow exploration depth.

According to the invention, the underwater vehicle which explores at a deep exploration depth can carry out the exploration more precisely.

In the present invention, the underwater vehicle which explores the deep exploration depth includes imaging means for taking an image of the water bottom.

According to the invention, an image of the water bottom can be included in the exploration result.

In the present invention, the underwater vehicle which explores the shallow exploration depth includes land form researching means which researches a land form of the water bottom and/or a geological layer researching means which researches a geological layer under the water bottom.

According to the invention, at least one of a land form and a geological layer of the water bottom can be included in the exploration result.

In the present invention the operating system of the multiple underwater vehicles further on-water control means includes acoustic positioning means and/or communication means and capable of cruising near a water surface, Wherein the on-water control means measures positions of the multiple underwater vehicles by the acoustic positioning means and/or the on-water control means performs communication with the communication means possessed by the multiple underwater vehicles, and the operating system executes the exploration mission.

According to the invention, since the on-water control means can. grasp at least one of positions and communication states of the multiple underwater vehicles, the multiple underwater vehicles can more safely and efficiently carry out the exploration operation under control of the on-control means.

Effect of the Invention

According to the operating method of the multiple underwater vehicles of the present invention, since the multiple underwater vehicles execute the exploration missions respectively allocated to different exploration depths, the exploration can be carried out efficiently.

If the multiple underwater vehicles include exploration regions at the respective set exploration depths, the respective exploration regions can further efficiently be explored.

If cruising paths of the underwater vehicles are set such that cruising loca of the underwater vehicles which cruise in the respective exploration regions are not vertically superposed on each other simultaneously, it is possible to prevent the underwater vehicles having close exploration depths from colliding against each other due to errors and the like in measurement and control, and it is possible to enhance the safety. Further, since the underwater vehicles are not vertically superposed on each other, it is possible to reduce generation of troubles in the underwater vehicles related to exploration such as erroneous observation and observation inability.

If the exploration depths which are differently set in the underwater vehicles include a deep exploration depth which is close to the water bottom and a shallow exploration depth which is far from the water bottom, it is possible to efficiently explore a region close to the water bottom and a region far from the water bottom.

If cruising speed of the underwater vehicle having the deep exploration depth is slower than cruising speed of the underwater vehicle having the shallow exploration depth, the underwater vehicle which carries out the exploration at deep exploration depths can carry out exploration more precisely.

If a height from the water bottom on which the underwater vehicle at the deep exploration depth can cruise is 1 m or more and less than 50 m and a height from the water bottom on which the underwater vehicle at the shallow exploration depth can cruise is 10 m or more and less than 200 m, at is possible to efficiently explore a region at a height of 1 m or more and less than 50 m from the water bottom and a region at a height of 10 m or more and less than 200 m.

If an image taking operation of the water bottom is included in the exploration mission of the underwater vehicle having the deep exploration depth, an image of the water bottom can be included in the exploration result.

If research of a land form of the water bottom and/or research of a geological layer underwater is included in the exploration mission of the underwater vehicle having the shallow exploration depth, at least one of the land form and the geological layer of the water bottom can be included in the exploration result.

If positions of the multiple underwater vehicles are measured by acoustic positioning means provided in the on-water control means having moving means and capable of cruising near a water surface and/or if communication is performed utilizing communication means which are respectively provided in the underwater vehicles and the on-water control means, and if the exploration mission is executed, the on-water control means can grasp at least one of positions and communication states of the multiple underwater vehicles. Therefore, the multiple underwater vehicles can more safely and efficiently carry out the exploration operation under control of the on-water control means.

Further, according to the operating system of the multiple underwater vehicles of the invention, since the multiple underwater vehicles execute the exploration missions allocated to different exploration depths, exploration can efficiently be carried out.

If the exploration condition setting means sets exploration regions of the multiple underwater vehicles at the respective set exploration depths, it is possible to explore the respective exploration regions more efficiently.

If the exploration regions are set such that cruising paths of the cruising underwater vehicles are not vertically superposed on each other simultaneously, it is possible to prevent the underwater vehicles having close exploration depths from colliding against each other due to errors and the like in measurement and control, and it is possible to enhance the safety. Further, since the underwater vehicles are not vertically superposed on each other, it is possible to reduce generation of troubles in the underwater vehicles related to exploration such as erroneous observation and observation inability.

If the exploration depths which are differently set by the exploration condition setting means include a deep exploration depth which is close to the water bottom and a shallow exploration depth which is far from the water bottom, it is possible to efficiently explore a region close to the water bottom and a region far from the water bottom.

If cruising speed of the underwater vehicle having the deep exploration depth is set slower than cruising speed of the underwater vehicle having the shallow exploration depth, the underwater vehicle which explores at the deep exploration depth can carry out the exploration more precisely.

If the underwater vehicle which explores the deep exploration depth includes imaging means for taking an image of the water bottom, an image of the water bottom can be included in the exploration result.

If the underwater vehicle which explores the shallow exploration depth includes land form. researching means which researches a land form of the water bottom and/or a geological layer researching means which researches a geological layer under the water bottom, at least one of the land form and the geological layer of the water bottom can be included in the exploration result.

If the operating system of the multiple underwater vehicles further on-water control means includes acoustic positioning means and/or communication means and capable of cruising near a water surface, and if the on-water control means measures positions of the multiple underwater vehicles by the acoustic positioning means and/or the on-water control means performs communication with the communication means possessed by the multiple underwater vehicles, and if the operating system executes the exploration mission, since the on-water control means can grasp at least one of the positions and the communication states of the multiple underwater vehicles, the multiple underwater vehicles can more safely and efficiently, carry out the exploration operation under control of the on-water control means.

MODE FOR CARRYING OUT THE INVENTION

An operating method and an operating system of a multiple underwater vehicles according to an embodiment of the present invention will be described below.

Figure 1:
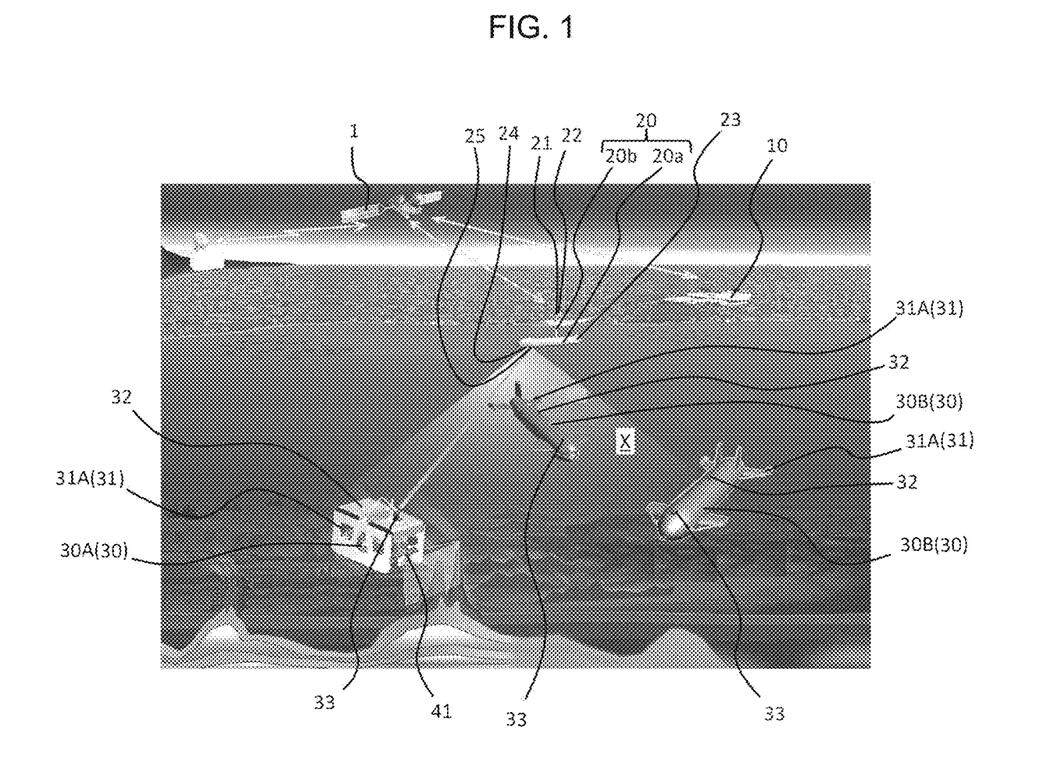
FIG. 1 is a schematic configuration diagram of an operating system of a multiple underwater vehicles according to an embodiment of the present invention.
Figure 2:
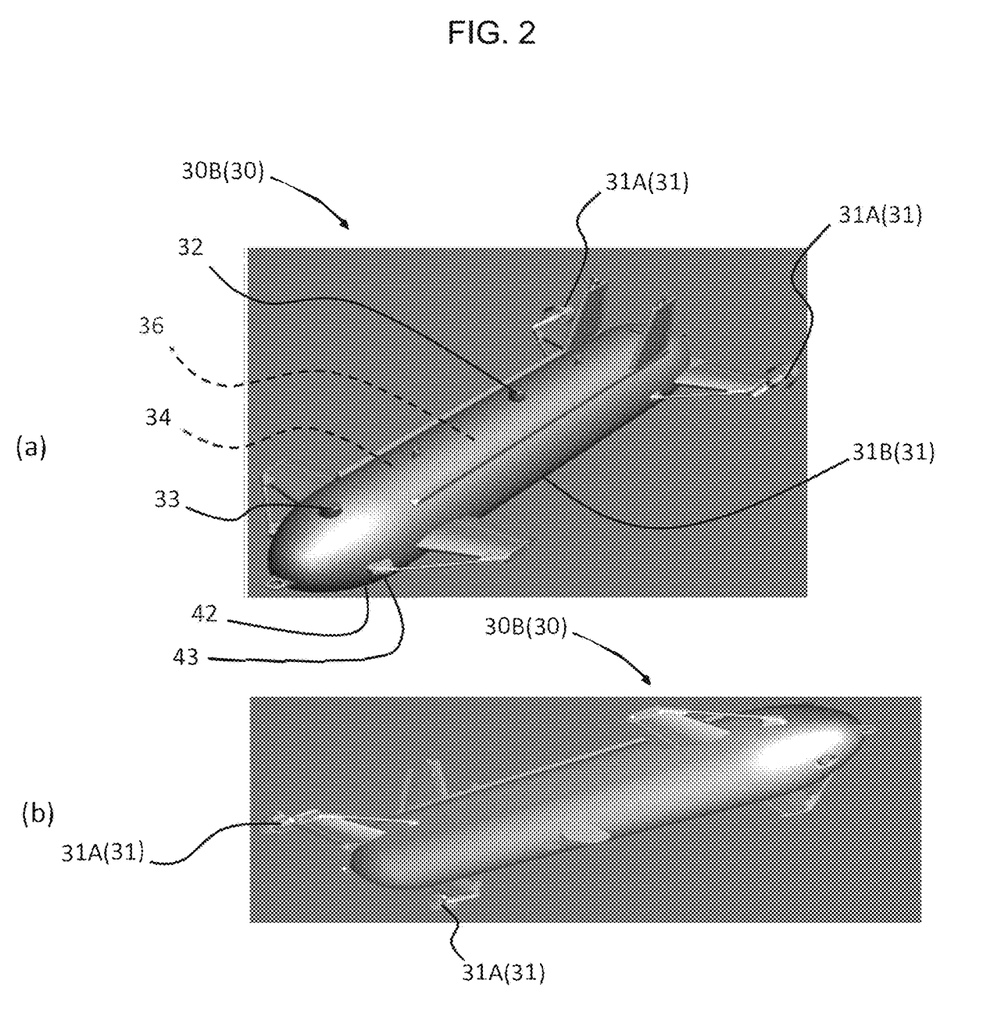
FIG. 2 are perspective outward appearance diagrams of the underwater vehicle.

FIG. 1 is a schematic configuration diagram of an operating system of a multiple underwater vehicles according to the embodiment, and FIG. 2 are perspective outward appearance diagrams of the underwater vehicle.

FIG. 1 shows a state in which one on-water control means 20 is made to launch in a research water area in marine or lake, and a multiple underwater vehicles 30 are introduced, and a water bottom is explored, thereby carrying out exploration of mineral resource, energy resource and the like of the water bottom. The on-water control means 20 and the underwater vehicles 30 are loaded in a support ship 10, and they are transported to the research water area.

The on-water control means 20 and the underwater vehicles 30 are no-cable type unmanned autonomous cruising robots. Since radio waves are not transmitted in water, the on-water control means 20 which is placed in the vicinity of a water surface controls, utilizing acoustic signals, the multiple underwater vehicles 30 which carry out the survey operation in water.

An offshore repeater (ASV: Autonomous Surface Vehicle) is used as the on-water control means 20. The on-water control means 20 includes a cylindrical main body 20a having a hemisphere end, and a vertical blade 20b extending from an upper surface of the main body 20a. The on-water control means 20 which is launched from the support ship 10 into the research water area is used in a semi-submersible state where the main body 20a is submerged underwater and an upper portion of the vertical blade 20b projects from a water surface. Own position grasping means 21 such as GPS and maritime communication means 22 such as a satellite communication antenna and a wireless LAN antenna are placed on the upper portion of the vertical blade 20b. The on-water control means 20 can grasp own position by receiving GNSS signals from a GNSS (global navigation satellite system) satellite 1 using own position grasping means 21. Communication with the support ship 10 can be established using the maritime communication means 22.

A rear portion of the main body 20a is provided with moving means 23 having a rudder and a propeller, and the main body 20a can move in the vicinity of a water surface by the moving means 23.

A lower surface of the main body 20a is provided with acoustic positioning means 24 and communication means 25. The communication means 25 includes a transmitter which sends acoustic wave and a wave receiver which receives acoustic wave. The on-water control means 20 measures a position of the underwater vehicle 30 using the acoustic positioning means 24, and bidirectionally communicates with the underwater vehicle 30 by acoustic signals using the communication means 25, and controls the underwater vehicle 30. The acoustic signals sent from the on-water control means 20 toward underwater easily reach within a substantially conical range having the on-water control means 20 as an apex. Therefore, this substantially conical range controlled by the on-water control means 20 is determined as a control region X.

A no-cable autonomous unmanned type vehicle (AUV: Autonomous Underwater Vehicle) which autonomously cruises in water without using a cable for connecting with the on-water control means 20 is used as the underwater vehicle 30. The on-water control means 20 controls a multiple underwater vehicles 30 using acoustic signals. Therefore, it is unnecessary to provide the on-water control means 20 with a facility for cable, a cable is not entangled or movement of the on-water control means 20 is not limited by the cable.

FIG. 1 shows a case where the multiple underwater vehicles 30 are one first underwater vehicle 30A and two second underwater vehicles 30B. Each of the first underwater vehicle 30A and the second underwater vehicles 30B is provided with cruising means (submerging means) 31 such as a rudder, a propulsion unite, and a ballast (weight), and by the cruising means 31, the underwater vehicle can cruise underwater and underwater navigate. The underwater vehicle 30 is provided with own vehicle positioning means 32 used for measuring a position of an own vehicle, communication means 33 used for bidirectional communication with the on-water control means 20 by acoustic signals, and an acoustic transponder (not shown) for responding a signal transmitted from the acoustic positioning means 24 of the on-water control means 20. The communication means 33 includes a transmitter for sending acoustic wave, and a wave receiver for receiving acoustic wave. The underwater vehicle 30 can emergency surface and can be collected by the support ship 10 when measurement of the on-water control means 20 fails predetermined times or when communication with the on-water control means 20 fails predetermined times.

Cruising speed of the hovering type first underwater vehicle 30A can be made slower than those of the second underwater vehicles 30B. The first underwater vehicle 30A includes a vertical thruster and a horizontal thruster, a free degree of movement of the first underwater vehicle 30A is higher than the second underwater vehicles 30B, and a position of the first underwater vehicle 30A can be held even in a place having water flow or the like. Therefore, the first underwater vehicle 30A mainly carries out a precise exploration near a water bottom. The first underwater vehicle 30A is provided with imaging means 41 for taking an image of a water bottom. The imaging means 41 is a camera including lighting for example.

FIG. 2(a) is a perspective view of the second underwater vehicles 30B as viewed from a diagonally upward direction, and FIG. 2(b) perspective view of the second underwater vehicles 30B as viewed from a diagonally downward direction. The cruising type second underwater vehicles 30B can move agilely at high speed as compared with the first underwater vehicle 30A. Therefore, the second underwater vehicles 30B mainly carry out exploration in a position separated away from a water bottom and in a wider range. Each of the second underwater vehicles 30B is provided with a land form researching means 42 for researching a land form of a water bottom and a geological layer researching means 43 for researching geological layer of water bottom. The land form researching means 42 and the geological layer researching means 43 are sonars for example. The second underwater vehicle 30B is provided at its rear portion with the propulsion unit 31A and at its lower portion with the ballast (weight) 31B as cruising means (submerging means) 31. The ballast 31B is mounted such that it can be separated away from the second underwater vehicle 30B.

Next, control of the underwater vehicle 30 will be described using FIGS. 3 and 4.

Figure 3:
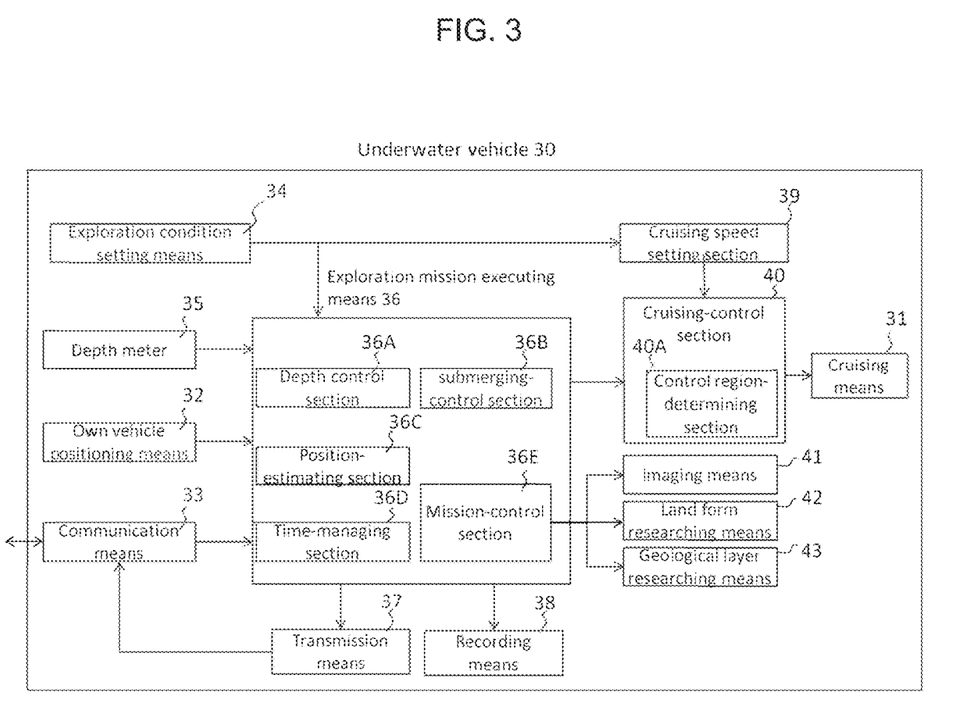
FIG. 3 is a control block diagram of the underwater vehicle.
Figure 4:
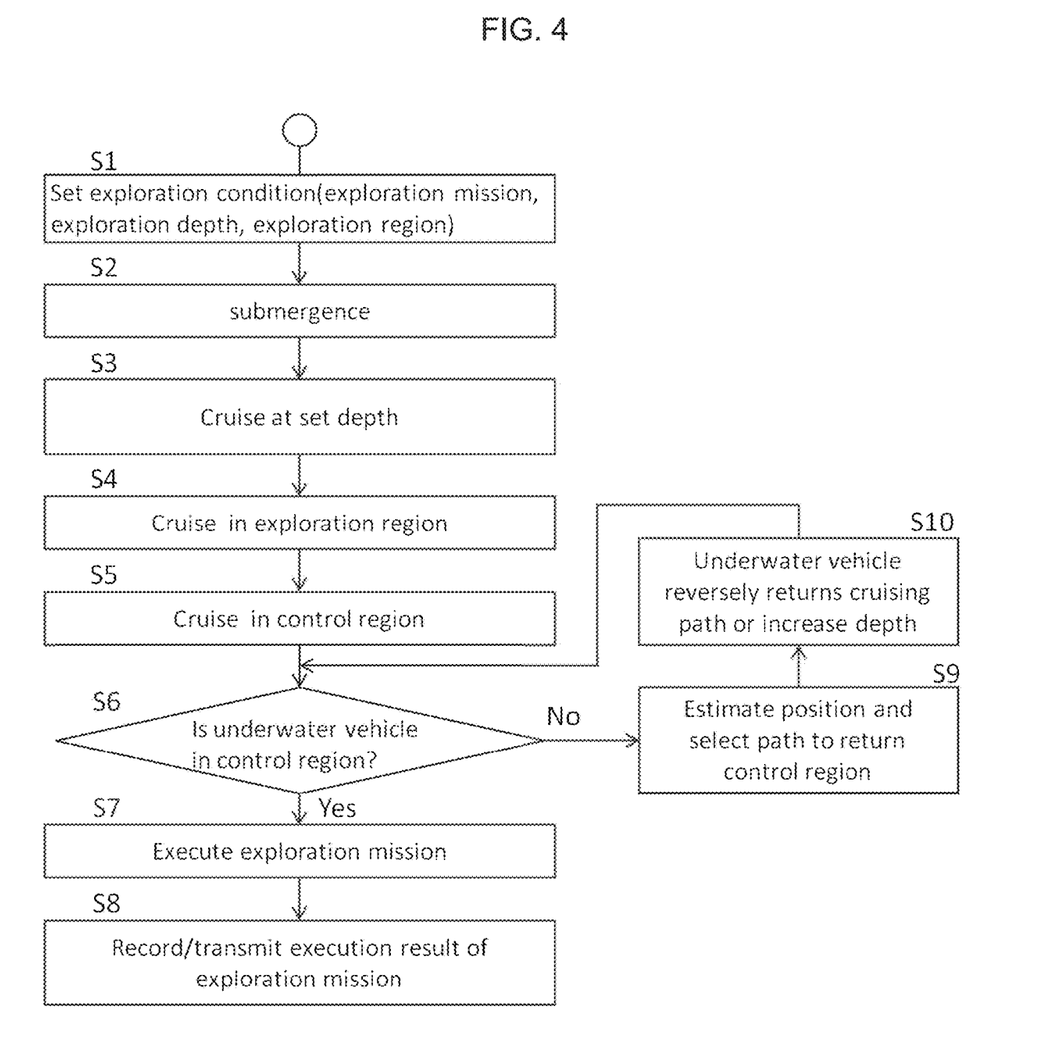
FIG. 4 is a control flowchart of the underwater vehicle.

FIG. 3 is a control block diagram of the underwater vehicle 30, and FIG. 4 is a control flow chart of the underwater vehicle 30.

Each of the underwater vehicles 30 includes cruising means 31, own vehicle positioning means 32, communication means 33, exploration condition setting means 34, depth meter 35, exploration mission executing means 36, transmission means 37, recording means 38, cruising speed setting section 39, cruising-control section 40, imaging means 41, land form researching means 42 and geological layer researching means 43.

The exploration mission executing means 36 includes a depth control section 36A, a submerging-control section 36B, a position-estimating section 36C, a time-managing section 36D and a mission-control section 36E.

The cruising-control section 40 includes a control region-determining section 40A.

An operator who embarks on the support ship 10 sets exploration conditions by inputting, to the underwater vehicle 30, information which is necessary for the exploration such as an exploration mission, an exploration depth, an exploration region and a cruising path of the underwater vehicle 30 using the exploration condition setting means 34 before the underwater vehicle 30 is introduced from the support ship 10 into the exploration water area, and the operator sets cruising speed for the underwater vehicle 30 using the cruising speed setting section 39 (step 1). The exploration missions, the exploration depths, the exploration regions, and the cruising paths are differently set for the respective underwater vehicles 30.

It is preferable that the multiple underwater vehicles 30 have exploration regions in the set respective exploration depths. According to this, it is possible to more efficiently explore the exploration regions.

It is preferable that the cruising paths are set such that cruising loca of the underwater vehicles 30 which cruise in the respective exploration regions are not superposed simultaneously. According to this, it is possible to prevent the underwater vehicles 30 having close exploration depths from colliding against each other due to errors and the like in measurement and control, and it is possible to enhance the safety. As the measurement errors, there are an error from initial stage of the own vehicle positioning means 32, the depth meter 35 and the like, and an error caused by aging degradation. As control errors, there are variation in a control part of the cruising-control section 40, an error of a driving system of the cruising means 31 and an error caused by the aging degradation.

The cruising loca of the underwater vehicles 30 are not superposed on each other simultaneously. In view of the above-described errors, when the underwater vehicles 30 are viewed from above, it is preferable that at least two times, preferably five times of the maximum value of a plane size of the underwater vehicle 30 is secured between the cruising loca as planar view. As vertical view also, it is preferable that at least two times, preferably five times of the maximum value of a vertical size of the underwater vehicle 30 is secured between the cruising loca.

Since the underwater vehicles 30 are not vertically superposed on each other, it is possible to lower a possibility of erroneous observation and observation inability of the underwater vehicle 30.

To prevent the multiple underwater vehicles 30 from being vertically superposed on each other to prevent the erroneous observation and observation inability, it is preferable to keep the distance between cruising loca which are not superposed on each other simultaneously when at least the above-described collision is prevented although this situation may differ depending upon the observing direction and a kind of the observing device of the multiple the underwater vehicles 30.

Especially, to make the multiple underwater vehicles 30 reliably execute the exploration mission, it is important not to superpose the multiple underwater vehicles 30 on each other vertically.

It is preferable that the exploration depths which are differently set for the respective underwater vehicles 30 include deep exploration depths which are close to the water bottom and shallow exploration depths which are far from the water bottom. It is more preferable that the deep exploration depth has a height (distance) of 1 m or more and less than 50 m from the water bottom, and the shallow exploration depth has a height (distance) of 10 m or more and less than 200 m from the water bottom. It is further preferable that the deep exploration depth has the height (distance) of 2 m or more and less than 20 m from the water bottom, and the shallow exploration depth has the height (distance) of 20 m or more and less than 50 m.

The deep exploration depth is mainly utilized for exploration using the imaging means 41, and the shallow exploration depth is mainly utilized for exploration using the land form researching means 42 and the geological layer researching means 43. When minerals or living things on the water bottom are collected, there is a case where a deep exploration depth which is more close to the water bottom is set in some cases. Depending upon a situation of a land form of the water bottom, there is a case where the deep exploration depth or the shallow exploration depth is set higher than the above-described numerals.

According to this, it is possible to efficiently explore a region close to the water bottom and a region far from the water bottom. In this embodiment, the hovering type first underwater vehicle 30A explores a region of the deep exploration depth, and the cruising type second underwater vehicle 30B explores a region of the shallow exploration depth. Since the cruising speed of the first underwater vehicle 30A is slower than that of the second underwater vehicle 30B, the first underwater vehicle 30A can more precisely explore a region close to the water bottom. When a land form of the water bottom is complicated, it is possible to lower a risk of collision of the first underwater vehicle 30A against the water bottom. It is possible to eliminate or reduce a damage of the first underwater vehicle 30A when it collides against the water bottom. For example, when the cruising speed of the first underwater vehicle 30A is set to 0.5 to 2 km/h, it is possible to eliminate or reduce a damage of the first underwater vehicle 30A when it collides against the water bottom. In this case, it is preferable that the cruising speed of the second underwater vehicle 30B is set to 2.5 to 10 km/h.

After step 1, the multiple underwater vehicles 30 which are introduced into the exploration water area start submerging (step 2).

The underwater vehicles 30 submerge using the propulsion unit 31A and the ballast 31B, but if the propulsion unit 31A is stopped and the underwater vehicles 30 submerge only by the weight of the ballast 31B, fuel can be saved.

When the underwater vehicles 30 submerge, each of the underwater vehicles 30 measures a depth and a position of the own vehicle using the depth meter 35 and the own vehicle positioning means 32, and the exploration mission executing means 36 having the depth control section 36A, the submerging-control section 36B and the position-estimating section 36C controls the cruising-control section 40 in accordance with the exploration depth which is set in step 1. The cruising-control section 40 controls the cruising means 31 in accordance with the control performed by the exploration mission executing means 36 and the cruising speed which is set by the cruising speed setting section 39.

The own vehicle positioning means 32 measures the position of the own vehicle by placing a speed. sensor and a gyroscope sensor, and detecting and calculating speed and acceleration of the own vehicle for example.

After step 2, the underwater vehicle 30 which reaches the set exploration depth starts cruising (step 3).

Each of the underwater vehicles 30 which starts cruising at the set exploration depth measures the position of the own vehicle using the own vehicle positioning means 32, and sends a result thereof to the exploration mission executing means 36. The exploration mission executing means 36 having the position-estimating section 36C controls the cruising-control section 40 such that the underwater vehicle 30 s cruises in the exploration region which is set in step 1. The cruising-control section 40 controls the cruising means 31 in accordance with the control performed by the exploration mission executing means 36 and the cruising speed which is set by the cruising speed setting section 39. According to this, the underwater vehicle 30 cruises in the exploration region (step 4).

The exploration mission executing means 36 having the time cruising-managing section 36D which manages time controls the cruising-control section 40 in accordance with a cruising path which is set in step 1 such that cruising loca of this underwater vehicle 30 and the other underwater vehicle 30 are not superposed on each other simultaneously.

The cruising-control section 40 cruises in the control region X of the on-water control means 20 based on an estimated position of the own vehicle received from the exploration mission executing means 36, a depth of the own vehicle and a communication state with the on-water control means 20 (step 5). The communication state with the on-water control means 20 is measured using the communication means 33, its measurement result is sent, to the exploration mission executing means 36, and the exploration mission executing means 36 grasps the communication state by a signal/noise ratio (S/N ratio) for example.

The cruising-control section 40 includes the control region-determining section 40A. The cruising-control section 40 periodically determines whether the own vehicle is located in the control region X based on the estimated position of the own vehicle and the communication state with the on-water control means 20 (step 6).

If it is determined in step 6 that the own vehicle is located in the control region X, the exploration mission is executed (step 7).

The mission-control section 36E of the exploration mission executing means 36 controls the imaging means 41 provided in the first underwater vehicle 30A. According to this, it is possible to take an image of the water bottom. If the mission-control section 36E controls the land form researching means 42 and the geological layer researching means 43 provided in the second underwater vehicle 30B, information of a land form of the water bottom and a geological layer under the water bottom can be obtained.

Exploration mission executing results such as information of the obtained shot image, the land form of the water bottom and the geological layer under the water bottom are recorded in the recording means 38 such as a hard disk and a magnetic tape. After the results are subjected to processing such as encoding by the transmission means 37, the results are sent to the on-water control means 20 using the communication means 33 (step 8).

If it is determined in step 6 that the own vehicle is not located in the control region X, the position-estimating section 36C estimates the position of the own vehicle based on the measurement result obtained by the own vehicle positioning means 32 and the measurement result obtained by the depth meter 35, and selects a path to return to the control region X (step 9).

In step 9, if the underwater vehicle reversely cruises the recorded cruising path and the path to return to the control region X is selected, the cruising-control section 40 controls the cruising means 31 to reversely return the path through which the underwater vehicle cruised heretofore. If the depth is increased and the path to return to the control region X is selected in step 9, the cruising-control section 40 controls the cruising means 31 such that the depth of the own vehicle is increased (step 10). According to this, the underwater vehicle 30 can return to the control region X by itself and the operation can be continued while again receiving control of the on-water control means 20. The underwater vehicle 30 can return to the control region X by increasing the depth. This is because that the control region X is in the form of an umbrella as shown in FIG. 1, and the larger the depth is, the wider the region in the horizontal direction becomes.

Next, the control of the on-water control means 20 will be described using FIGS. 5 and 6.

Figure 5:
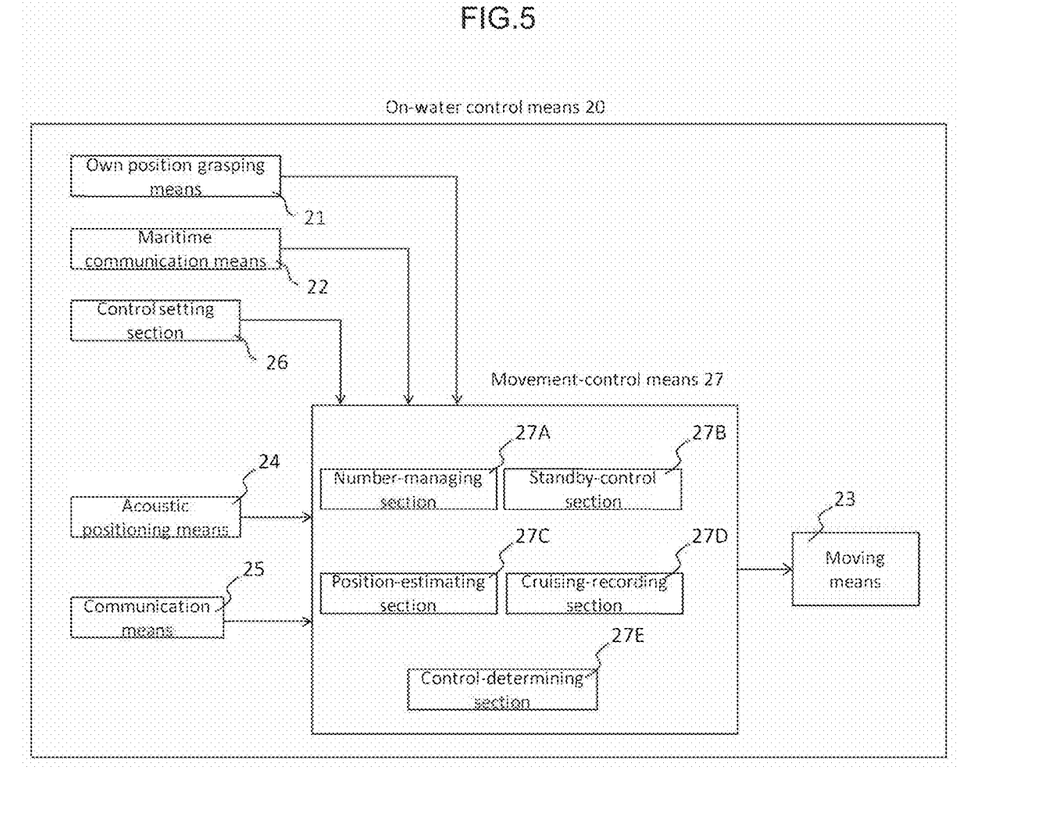
FIG. 5 is a control block diagram of on-water control means.
Figure 6:
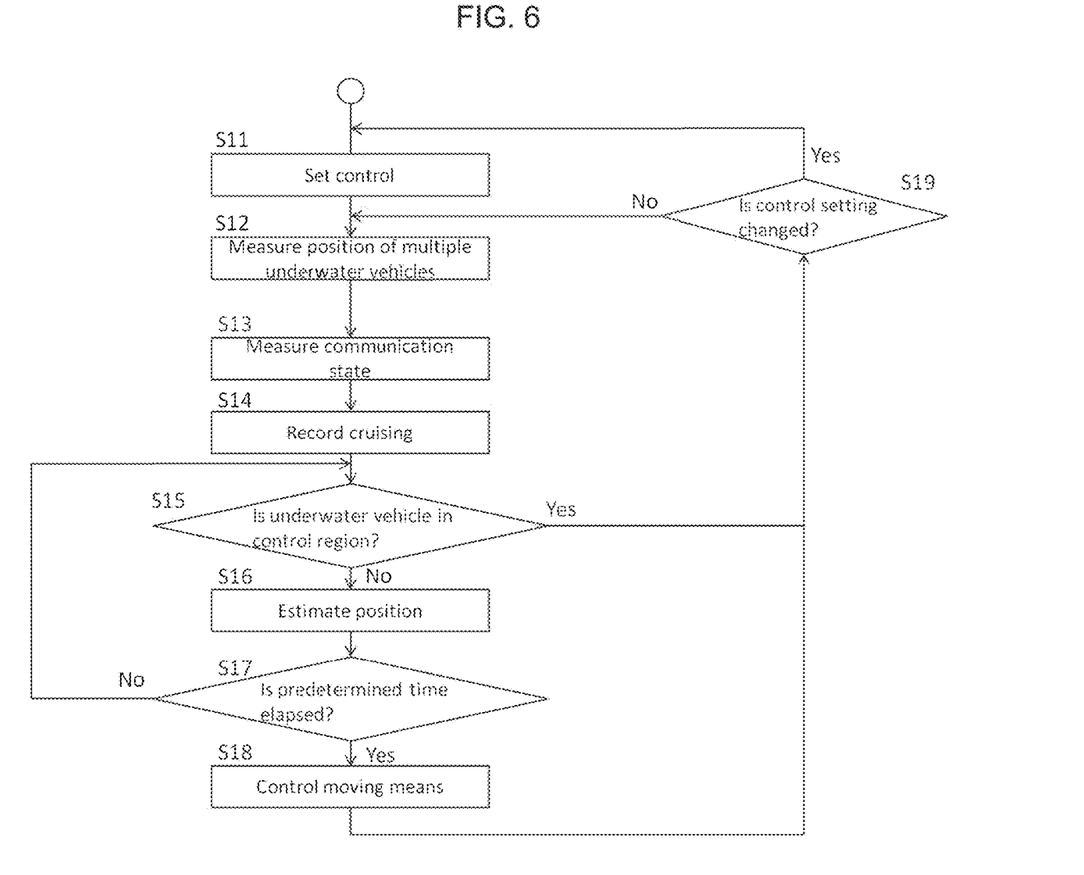
FIG. 6 is a control flow chart of the on-water control means.

FIG. 5 is a control block diagram of the on-water control means 20, and FIG. 6 is a control flow chart of the on-water control means 20.

The on-water control means 20 includes the own position grasping means 21, the maritime communication means 22, the moving means 23, the acoustic positioning means 24, the communication means 25, a control setting section 26 and movement-control means 27.

The movement-control means 27 includes a number-managing section 27A, a standby-control section 27B, a position-estimating section 27C, a cruising-recording section 27D and a control-determining section 27E.

Before the on-water control means 20 launches from the support ship 10 into the research water area, an operator who embarks on the support ship 10 inputs, to the on-water control means 20, information which is necessary for the control such as a moving range of the on-water control means 20, the number and performance of the underwater vehicles 30 which will be controlled using the control setting section 26, thereby setting the control (step 11).

After step 11, the on-water control means 20 which launches into the research water area starts controlling the underwater vehicle 30 in accordance with the control setting which is set in step 11. First, positions of the multiple underwater vehicles 30 are measured using the acoustic positioning means 24, and measurement results are sent to the movement-control means 27 (step 12).

After step 12, communication states of the multiple underwater vehicles 30 are measured using the communication means 25, and measurement results are sent to the movement-control means 27 (step 13). The communication states are grasped by the signal/noise ratio (S/N ratio) for example.

Based on the measurement results received in step 12 and the measurement results in step 13, the movement-control means 27 records cruising paths of the respective underwater vehicles 30 together with time in the cruising-recording section 27D (step 14).

After step 14, the number-managing section 27A compares, with each other, the number of underwater vehicles 30 which are input in the control setting in step 11 and the number of underwater vehicle 30 in which the cruising paths are recorded in step 14, and the number-managing section 27A determines whether all of the underwater vehicles 30 which should be controlled are located in the control region X (step 15).

In step 15, when it is determined that the number of the underwater vehicles 30 in which the cruising paths are recorded is equal to or larger than the number of the underwater vehicles 30 which should be controlled, i.e., when it is determined that all of the underwater vehicles 30 which should be controlled are located in the control region X, this result is sent to the control-determining section 27E.

In this case, the movement-control means 27 predicts behaviors of the multiple underwater vehicles 30 based on the cruising paths recorded in the cruising-recording section 27D, and based on this prediction result, control may be performed to move the on-water control means 20 such that the underwater vehicles 30 do not deviate from the control region X. According to this, it is possible to prevent the underwater vehicles 30 from deviating from the control region X.

When moving the on-water control means 20, it is preferable that the on-water control means 20 is moved in a range where the number of the multiple underwater vehicles 30 located in the control region X when the movement is started is not reduced. According to this, it is possible to prevent the number of the underwater vehicles 30 located in the control region X from being reduced.

In step 15, when it is determined that the number of the underwater vehicles 30 in which the cruising paths are recorded is smaller than the number of the underwater vehicles 30 which should be controlled, i.e., when it is determined that one or some or all of the underwater vehicles 30 which should be controlled deviate from the control region X, the position-estimating section 27C estimates a direction in which an underwater vehicle 30 which deviates from the control region X exists based on the cruising paths of the underwater vehicles 30 recorded in the cruising-recording section 27D (step 16).

After step 16, the standby-control section 27B determines whether predetermined time is elapsed after it is first detected that an underwater vehicle 30 deviates from the control region X in step 15 (step 17).

When it is determined in step 17 that the predetermined time is not elapsed, the procedure returns to step 15, and it is again determined whether all of the underwater vehicles 30 which should be controlled are located in the control region X.

If it is determined in step 17 that the predetermined time is elapsed, the standby-control section 27B sends a determination result of step 15 to the control-determining section 27E, and instructs to start moving the on-water control means 20 (step 18). According to this, the moving means 23 operates and the on-water control means 20 is moved.

Even when it is determined that one or some or all of the underwater vehicles 30 which should be controlled deviate from the control region X, there are a possibility that an underwater vehicle 30 which deviates from the control region X returns into the control region X by itself and a possibility that although an underwater vehicle is actually located in the control region X, it is erroneously detected that the underwater vehicle deviates from the control region X by temporal positioning or communication failure. Therefore, it is possible to lower a possibility that the on-water control means 20 unnecessarily moves by keeping, before moving the on-water control means 20, the on-water control means 20 on standby for predetermined time after it is detected that the underwater vehicle 30 deviates from the control region X, and by repeating the determination of step 15 predetermined times during that time as in this embodiment. According to this, it is possible to prevent consumption of energy of the on-water control means 20 and prevent the underwater vehicle 30 located in the control region X from deviating from the control region X.

The position-estimating section 27C estimates a direction in which an underwater vehicle 30 which deviates from the control region X exists based on the cruising paths of the underwater vehicles 30 recorded in the cruising-recording section 27D, and the movement-control means 27 controls the moving means 23 based on this estimation result. According to this, it is possible to enhance the control precision and moving efficiency of the on-water control means 20, and an underwater vehicle 30 which deviates from the control region X can be returned to the control region X faster.

When the movement-control means 27 moves the on-water control means 20, it is preferable to control the moving means 23 such that the on-water control means 20 is moved to a position where all of the multiple underwater vehicles 30 can be controlled. According to this, since all of the underwater vehicles 30 can be placed under control of the on-water control means 20, the underwater exploration can be carried out more safely and efficiently.

When all of the multiple underwater vehicles 30 cannot be controlled, it is preferable that the movement-control means 27 controls the moving means 23 such that the on-water control means 20 moves to a position where the maximum number of the multiple underwater vehicles 30 can be controlled. According to this, the number of underwater vehicles 30 which deviate from the control region X can be minimized. In this case, it is preferable that the maximum number is obtained by subtracting, from the number of multiple underwater vehicles 30, the number of uncontrollable underwater vehicles 30 including any of an underwater vehicle 30 which deviates from the control region X, a damaged underwater vehicle 30, and a surfaced underwater vehicle 30. According to this, a multiple underwater vehicles 30 which can explore can be located in the control region X and the underwater exploration can be continued.

The control-determining section 27E determines whether control setting should be changed based on a determination result sent from the number-managing section 27A or the standby-control section 27B (step 19).

In step 19, when the determination result is received from the number-managing section 27A and when the number of the underwater vehicles 30 which should be controlled and the number of the underwater vehicles 30 in which the cruising paths thereof are recorded are the same, the control setting is not changed and the procedure proceeds to step 12.

Further, when the determination result is received from the number-managing section 27A and when the number of the underwater vehicles 30 in which the cruising paths thereof are recorded is larger than the number of the underwater vehicles 30 which should be controlled, the procedure proceeds to step 11, and the control setting section 26 changes the control setting to setting including a underwater vehicle 30 which returns to the control region X. According to this, control can be continued including the underwater vehicle 30 which returns to the control region X.

When the determination result is received from the standby-control section 27B, i.e., when a determination result indicating that there is an underwater vehicle 30 which deviates from the control region X is received, the procedure proceeds to step 11, and the control setting section 26 changes the control setting to setting excluding the underwater vehicle 30 which deviates from the control region X. According to this, control can be continued excluding the underwater vehicle 30 which deviates from the control region X.

As described above, the on-water control means 20 includes the number-managing section 27A which manages the number of the multiple underwater vehicles 30. According to this, it is possible to control the movement of the on-water control means 20 based on the number of the underwater vehicles 30.

Since the on-water control means 20 moves the multiple underwater vehicles 30 to positions where they can be positioned, it is possible to locate the multiple underwater vehicles 30 in the control region X and continue the exploration.

By moving the on-water control means 20 to a position where communication with the multiple underwater vehicles 30 can be established, it is possible to carry out the exploration more safely and efficiently.

According to these, it is possible to research a wide water area safely and efficiently without losing sight of a multiple underwater vehicles 30.

The exploration conditions which are set by the exploration condition setting means 34 of the multiple underwater vehicles 30 are setting of the exploration conditions in the support ship 10 and except this, instructions from the support ship 10 can also be renewed automatically through the on-water control means 20 or based on a schedule which is programed in the on-water control means 20.

INDUSTRIAL APPLICABILITY

The operating method of the multiple underwater vehicles and the operating system of the multiple underwater vehicles according to the present invention can deploy and operate the multiple underwater vehicles in the research water area, and the exploration of a water bottom can safely and efficiently be carried out.

EXPLANATION OF SYMBOLS 20 on-water control means
24 acoustic positioning means
25 communication means
30 underwater vehicle
31 cruising means (submerging means)
33 communication means
34 exploration condition setting means
36 exploration mission executing means
37 transmission means
38 recording means
41 imaging means
42 land form researching means
43 geological layer researching means

The invention claimed is:

1. An operating method of a multiple underwater vehicles, wherein in order to explore a water bottom, exploration missions and exploration depths of the multiple underwater vehicles which cruise at an exploration depth close to a water bottom are previously differently set in the underwater vehicles, the multiple underwater vehicles are submerged to the respective set exploration depths, the multiple underwater vehicles are made to cruise at the respective set exploration depths to execute the exploration missions under control of a on-water control means placed near a water surface, and execution results of the exploration missions are recorded and/or transmitted,
   wherein the exploration depths which are differently set in the underwater vehicles include a deep exploration depth which is close to the water bottom and a shallow exploration depth which is far from the water bottom,
   wherein a height from the water bottom on which the underwater vehicle at the deep exploration depth can cruise is 1 m or more and less than 50 m, and a height from the water bottom on which the underwater vehicle at the shallow exploration depth can cruise is 10 m or more and less than 200 m, and
   wherein cruising speed of the underwater vehicle having the deep exploration depth is slower than cruising speed of the underwater vehicle having the shallow exploration depth.

2. The operating method of the multiple underwater vehicles according to claim 1, wherein the multiple underwater vehicles include exploration regions at the respective set exploration depths.

3. The operating method of the multiple underwater vehicles according to claim 2, wherein cruising paths of the underwater vehicles are set such that cruising local of the underwater vehicles which cruise in the respective exploration regions are not vertically superposed on each other simultaneously.

4. The operating method of the multiple underwater vehicles according to claim 1, wherein an image taking operation of the water bottom is included in the exploration mission of the underwater vehicle having the deep exploration depth.

5. The operating method of the multiple underwater vehicles according to claim 1, wherein research of a land form of the water bottom and/or research of a geological layer underwater is included in the exploration mission of the underwater vehicle having the shallow exploration depth.

6. The operating method of the multiple underwater vehicles according to claim 1, wherein positions of the multiple underwater vehicles are measured by acoustic positioning means provided in the on-water control means having moving means and capable of cruising near a water surface and/or communication is performed utilizing communication means which are respectively provided in the underwater vehicles and the on-water control means, and the exploration mission is executed.

7. An operating system of a multiple underwater vehicles comprising the multiple underwater vehicles which cruise at an exploration depth close to a water bottom, exploration condition setting means which previously differently sets exploration missions and exploration depths provided in the multiple underwater vehicles, submerging means for submerging the multiple underwater vehicles to the respective set exploration depths, on-water control means placed near a water surface, exploration mission executing means for cruising the multiple underwater vehicles at the respective set exploration depths to execute the exploration missions under control of the on-water control means, and recording means and/or transmission means for recording and/or transmitting an execution result of the exploration mission, wherein the exploration depths which are differently set by the exploration condition setting means include a deep exploration depth which is close to the water bottom and a shallow exploration depth which is far from the water bottom, wherein a height from the water bottom on which the underwater vehicle at the deep exploration depth can cruise is 1 m or more and less than 50 m, and a height from the water bottom on which the underwater vehicle at the shallow exploration depth can cruise is 10 m or more and less than 200 m, and wherein cruising speed of the underwater vehicle having the deep exploration depth is set slower than cruising speed of the underwater vehicle having the shallow exploration depth.

8. The operating system of the multiple underwater vehicles according to claim 7, wherein the exploration condition setting means sets exploration regions of the multiple underwater vehicles at the respective set exploration depths.

9. The operating system of the multiple underwater vehicles according to claim 8, wherein the exploration regions are set such that cruising paths of the cruising underwater vehicles are not vertically superposed on each other simultaneously.

10. The operating system of the multiple underwater vehicles according to claim 7, wherein the underwater vehicle which explores the deep exploration depth includes imaging means for taking an image of the water bottom.

11. The operating system of the multiple underwater vehicles according to claim 7, wherein the underwater vehicle which explores the shallow exploration depth includes land form researching means which researches a land form of the water bottom and/or a geological layer researching means which researches a geological layer under the water bottom.

12. The operating system of the multiple underwater vehicles according to claim 7, further comprising the on-water control means having acoustic positioning means and/or communication means and capable of cruising near a water surface, wherein the on-water control means measures positions of the multiple underwater vehicles by the acoustic positioning means and/or the on-water control means performs communication with the communication means possessed by the multiple underwater vehicles, and the operating system executes the exploration mission.

* * * * *